June 14, 1938.  C. S. JANES  2,120,703
MOTION ANALYZING AND RECORDING APPARATUS
Filed Feb. 26, 1935  4 Sheets-Sheet 3

INVENTOR.
BY Clinton S. Janes
ATTORNEY.

Witness:
Burr W. Jones

June 14, 1938.　　　　C. S. JANES　　　　2,120,703
MOTION ANALYZING AND RECORDING APPARATUS
Filed Feb. 26, 1935　　　　4 Sheets-Sheet 4
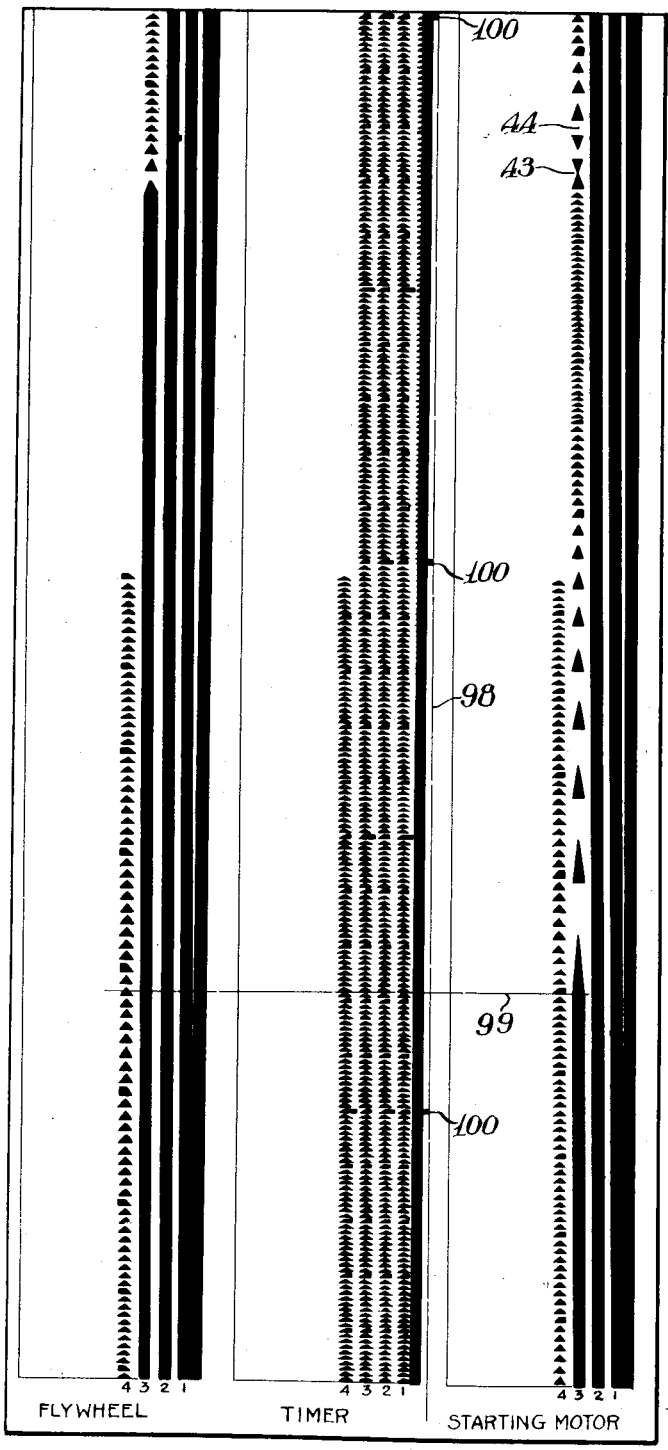
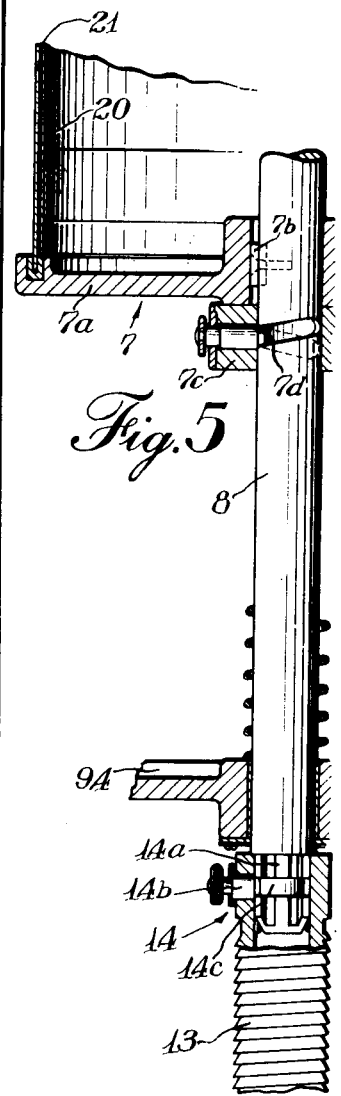
Fig. 5
Fig. 6
INVENTOR.
BY Clinton S. Janes
ATTORNEY.
Witness:

Patented June 14, 1938

2,120,703

UNITED STATES PATENT OFFICE 2,120,703

MOTION ANALYZING AND RECORDING APPARATUS

Clinton S. Janes, Elmira, N. Y., assignor to Eclipse Machine Company, Elmira, N. Y., a corporation of New York Application February 26, 1935, Serial No. 8,357

8 Claims. (Cl. 234—60)

This invention relates to motion analyzing and recording apparatus and more particularly to a precision instrument for furnishing a convenient record either continuous or by minute increments of the motion of a device to be analyzed or of a plurality of devices to be simultaneously analyzed. The instrument is also preferably arranged to furnish a simultaneous record of suitably minute increments of time.

It is an object of the present invention to provide a novel instrument of the above character which is efficient and reliable in operation and simple and economical in construction.

It is a further object to provide such an instrument which records the time, amount and direction of motion of the device or devices to be analyzed.

It is a further object to provide such an instrument which is particularly suitable for precise micrometric analyses of rapid motion and reversals of motion.

It is another object to provide such an instrument which is readily adaptable to furnish a record of convenient scale for the particular phenomena to be studied.

It is a further object to provide such an instrument which produces directly a true record of the motion to be analyzed without introducing any significant errors, time lags or fluctuations.

It is a further object to provide such an instrument of which the record may be used directly for plotting time-displacement curves without the necessity of any correction factors.

It is a further object to provide such an instrument in which the time-recording arrangement is simple in construction and extremely accurate.

Further objects and advantages will be apparent from the following description taken in connection with the accompanying drawings which illustrate a preferred form of the invention and in which:

Fig. 5 is an enlarged sectional detail showing the method of mounting the removable drum head and the coupling between the drum shaft and its driving shaft; and Fig. 6 is a sample record sheet showing the record partially completed, to an enlarged scale.

Figure 1:
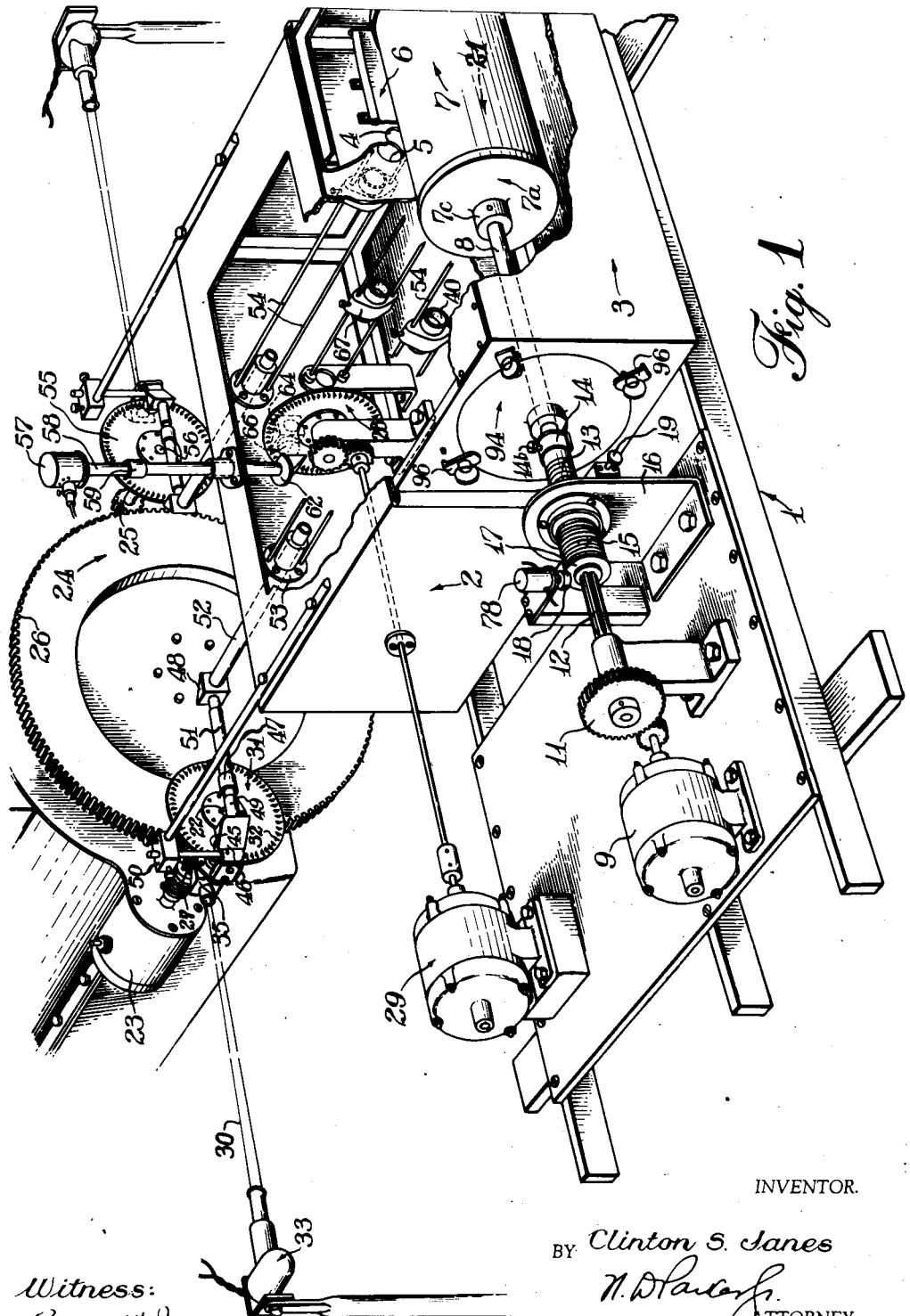
Fig. 1 is a perspective view partly broken away showing the instrument as applied to analyze simultaneously the motion of a starting motor and a flywheel of an internal combustion engine during the starting operation.

Referring first to Fig. 1 of the drawings, there is illustrated a frame or base indicated generally at 1 on which is rigidly mounted a light-tight lens box 2. A light-tight record drum box 3 is detachably mounted on the side of the lens box 2 and is provided with openings 4 registering with openings 5 in the side of the lens box 2, a movable slide 6 being provided in the drum box for closing the openings 4 prior to the removal of the drum box from the lens box.

A record drum 7 is slidably and rotatably journalled in the drum box 3 as by means of a shaft 8 freely journalled therein. Means are provided for rotating the drum in the form of a motor 9 mounted on the base 1 and connected through suitable gearing 11 to a splined shaft 12 having a telescoping fit in an internally splined screw shaft 13. Shaft 13 is detachably coupled to the shaft 8 in any suitable way, a preferred form of coupling 14 being illustrated in Fig. 5 in the form of a splined connection 14a with a removable locking pin 14b in the screw shaft engaging a groove 14c in the drum shaft.

Means independent of power from the motor 9 for traversing the drum 7 is provided in the form of a spring 15 (Figs. 1 and 2) bearing at one end against a fixed abutment 16 and at the other end against a flange 17 fixed to the screw shaft 13 and thereby tending to move the drum 7 to the left. Such traversing movement of the drum is normally prevented by a latch 18 bearing against the flange 17, and when such latch is withdrawn, the traversing movement is controlled by one or more spring-pressed detents 19 mounted in the abutment 16 and engaging in the threads of the shaft 13. Since these threads are formed as buttress threads as shown, it will be understood that during rotation of the shaft 13 while the latch 18 prevents traversal thereof, the detents 19 merely slide over the threads, but when the latch 18 is released the detents 19 act as a stationary nut through which the shaft screws itself. Since the drum shaft 8 is rigidly coupled to the screw shaft, the drum 7 is rotated and traversed therewith.

The drum 7 is arranged to carry a light-sensitive cylinder 21 (Fig. 3) on which the records of movements of the devices to be analyzed are photographically impressed. The record cylinder 21 may be mounted on the drum 7 in any suitable manner but it is preferred to make the cylindrical portion of the drum of transparent material such as glass, celluloid or the like and place therein a suitable sheet of sensitized photographic paper backed up by preferably opaque means 20 (Fig. 5) for expanding it against the interior of the drum.

In order to permit the mounting and removal of the record cylinder from the drum, the head 7a (Fig. 5) of the drum is made removable and is fixed to the shaft by suitable means such as the key 7b and wedge ring 7c with inclined pin and slot connection 7d.

As illustrated in Fig. 1, three separate optical systems are used for making simultaneously three records of movement on the record drum. As there illustrated, one system records movements of the armature shaft 22 of starting motor 23, a second system records movements of the engine flywheel 24 as multiplied by means of a pinion 25 meshing with the flywheel gear 26 and preferably having the same number of teeth as the starter pinion 27. The third or timing system, which is preferably located intermediate the first and second systems, records the movement of a timing disc 28 which is driven at a predetermined constant speed through suitable gearing from a synchronous alternating current motor 29.

Figure 2:
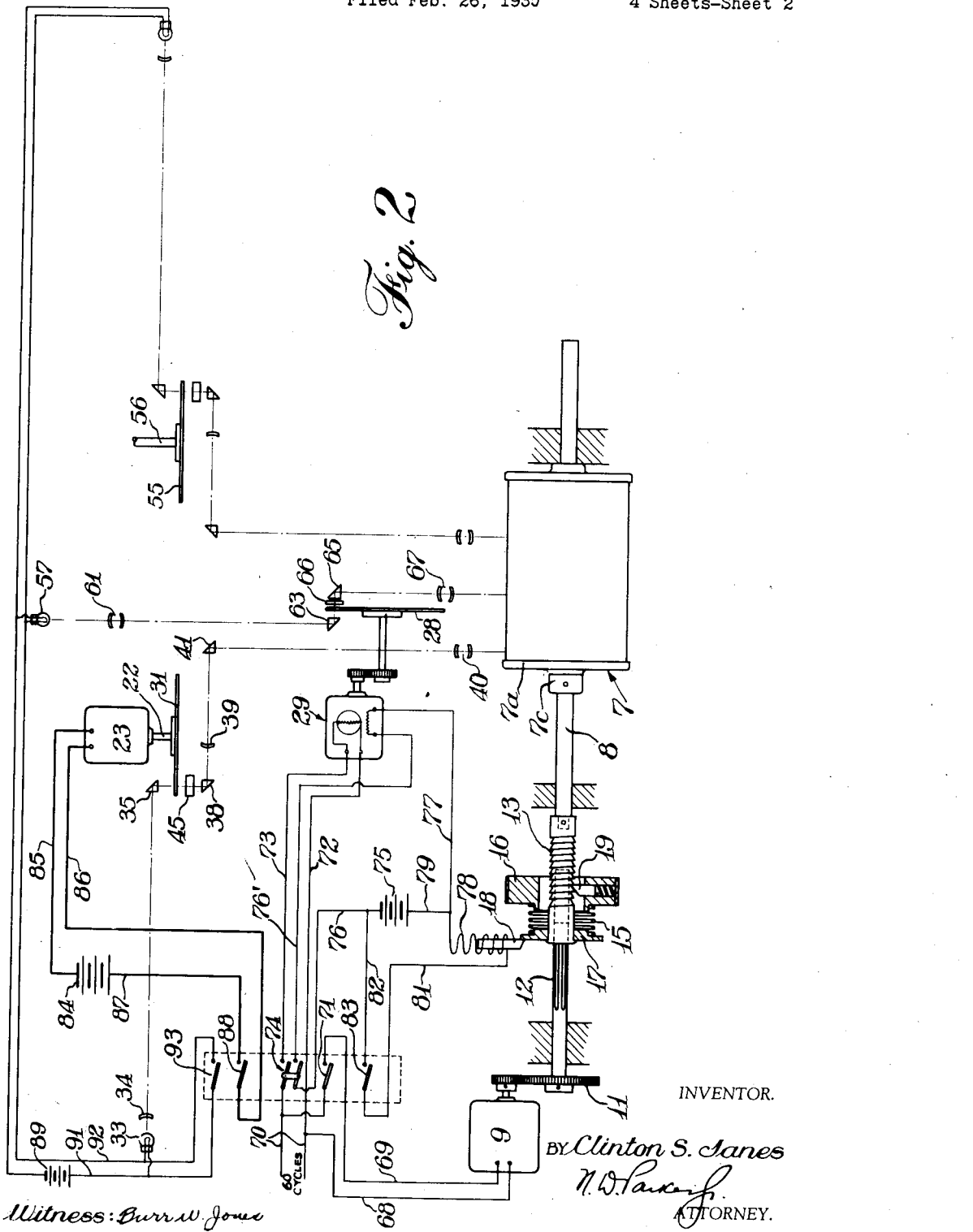
Fig. 2 is a semi-diagrammatic view showing the optical and electrical systems and the operating mechanism for the recording drum.
Figure 3:
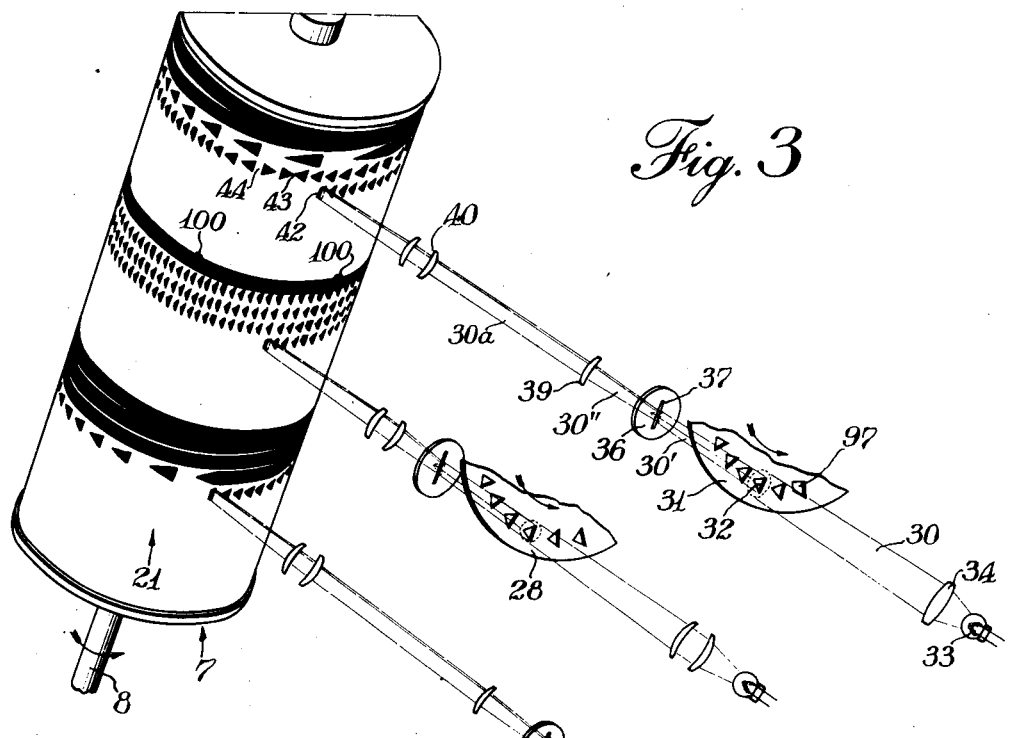
Fig. 3 is a diagrammatic view in perspective illustrating the principles of operation of the optical systems and the character of the record produced thereby but omitting the prisms and extraneous devices and greatly enlarging the components of the record for the sake of clarity.

The recording system for the starting motor shaft comprises an opaque diaphragm in the form of a disc 31 rigidly keyed on the armature shaft and having a series of small openings 32 (Figs. 1 and 3) in the form of a ring near its periphery. A beam of light 30 from a light source 33 is directed through said openings by suitable means such as a condensing lens 34 (Fig. 2) and a prism 35, the arrangement being preferably such as illustrated in Fig. 3 in which the beam is condensed until it is but slightly wider than the radial width of an opening 32. The configuration of the beam 30 at this point depends on the shape of the incandescent element of the source of light, an image of which is approximately focused on the disc 31.

A second opaque diaphragm 36 (Fig. 3) (in holder 45, Fig. 1) is arranged in the path of the beam of light on one side of the disc 31, it being here illustrated on the side away from the light source since this arrangement is most convenient for the exclusion of extraneous light from the lens box. The diaphragm 36 is provided with a narrow slot 37 which is arranged perpendicular to the direction of travel of the openings 32 as they traverse the light beam 30. In other words, in the arrangement here shown the slot 37 is approximately radial to the axis of the disc 31. The triangular beam of light 30' passed by an opening 32 of the disc is thus converted after passing through the slot 37 into a ribbon 30" which diverges from the secondary focal point of the condensing lens 34, which focal point is as above intimated, adjacent the disc 31. It will be understood that the disc 31 and slot diaphragm 36 are preferably arranged in close proximity, although if the light beam is, as illustrated, only slightly convergent, these elements may be separated a substantial distance without impairing the sharpness of the image formed upon the record cylinder.

The diverging ribbon of light 30" is deflected into parallelism with the original beam 30 by suitable means such as a prism 38 (Fig. 2) (in holder 46, Fig. 1), and the divergency of this ribbon is controlled by a suitable condensing lens 39 (in holder 47, Fig. 1) which may be arranged to cause parallelism or slight convergency thereof as illustrated at 30a. The light beam 30a is directed into the lens box 2 by suitable means such as a prism 41 (in holder 48, Fig. 1) and a suitable projection lens 40 is mounted in the lens box in position to converge the beam 30a onto the record cylinder 21 in the form of a line of light 42 (Fig. 3).

Figure 4:
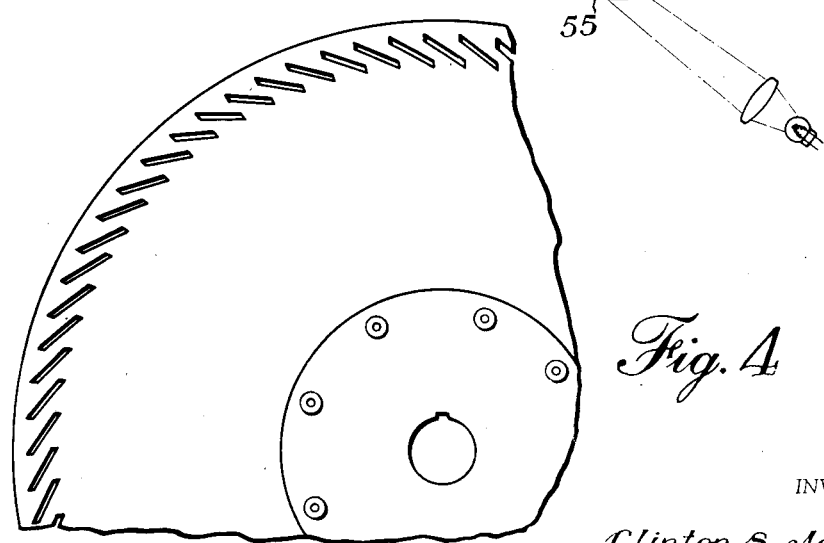
Fig. 4 is an enlarged detail showing a form of disc by which a continuous record of movement may be obtained.

It will be noted that the line 42 is in effect an image of the slot 37 as illuminated by the beam of light from the light source, so that the thickness of the line 42 is controlled by the width of the slot 37 and the extent of the line 42 is determined by the side edges of the opening 32 in the disc 31. As here illustrated, the openings 32 are triangular in shape and arranged so that when the base of a triangle 32 is in alignment with the slot 37, the line of light 42 is at its maximum length, and rotation of the disc 31 will cause the side edges of the opening 32 to cut down the length of the line 42 until the apex of the triangle passes out of line with the slot 37, whereupon the light is completely interrupted until the base f the next triangle 32 comes opposite the slot 37. The shape of the openings 32 is preferably unsymmetrical with respect to radii of the disc in order that the images thereof as scanned through the slot 37 may show distinctively the direction of movement of the disc with respect to said slot. The triangular form of openings here illustrated is well suited for this purpose as will be noted by an examination of Figs. 3 and 6 where reversals of motion of the armature disc are shown at 43 and 44. If it be desired to obtain an absolutely continuous record of movement without any periods of darkness on the record, other forms of opening may be used such as slightly inclined narrow parallelograms as illustrated in Fig. 4.

In order to prevent extraneous light from entering the lens box 2, a holder 45 is provided for the slot diaphragm 36, and the prism 38, lens 39 and prism 41 are mounted in holders 46, 47 and 48 respectively which are connected by light-tight telescoping tubing 49 and 51, and the prism holder 48 is connected to the lens box 2 by tubing 52 which telescopes within a suitable holder 53 in the wall of said box. The prism and lens system is preferably supported adjacent the disc 31 by a suitable bracket arrangement 50 supported from the lens box, and the projection lens 40 is adjustably mounted in suitable guides 54 within the lens box in order to provide a conveniently adjustable optical system.

Since the edges of the beam or ribbon of light 30a between the second condensing lens 39 and the projection lens 40 are substantially parallel, the length of the tubes 51 and 52 may be varied through wide limits without affecting the optical system. Vertical adjustment of the optical system supported by the adjustable bracket 50 is also permitted by rotation of the tube 51 around the axis of the holder 53 and swinging rotation of the slot element 36 in its holder 45 to maintain the slot horizontal.

A disc 55 similar to disc 31 is rigidly keyed on a shaft 56 driven by pinion 25 from the flywheel gear 26, and the motion of the flywheel disc 55 is recorded on the record cylinder 21 within the drum 7 by means of an optical system identical in character with that provided for the armature disc 31.

The optical system for the timing disc 28 is generally similar to the optical system for the armature and flywheel discs, but the light source 57 therefor is mounted as shown directly on the top of the lens box 2, and since it is therefore unnecessary to provide for adjustability between the components of the optical system, some simplification thereof is possible. As shown in Fig. 1, the light source 57 is simply mounted at the top of a tube 58 in which is interposed a holder 59 for condensing lens 61 (Fig. 2). The lower end of the tube 58 carries a holder 62 for a prism 63 (Fig. 2), and a second prism holder 64 is mounted on the bottom of the box 2 and carries a prism 65 for directing the beam of light onto the record cylinder 21. The prism holder 64 is also arranged to carry a slot holder 66 in position to scan the beam of light directed by the prism 63 through the openings in the disc 28. A projection lens 67 is adjustably mounted on suitable guides in the box 2 for projecting the image of the slot upon the drum as previously described.

The motor 29 for the timing device is energized from mains connected to the public alternating current power system. Since the public power systems are accurately synchronized from a master control station, the frequency thereof is substantially invariable, and the synchronous motor 29 rotating in step therewith causes the timing disc 28 to uniformly record equal increments of time on the record cylinder.

A suitable electrical system for the apparatus is provided for the convenient control of the elements thereof. As illustrated in Fig. 2, this system comprises a circuit from the alternating current mains 70 to the driving motor 9 for the drum 7 including leads 68 and 69 and manual switch 71. There is also provided a circuit from the alternating current mains to the synchronous motor 29 including leads 72 and 73 and manual switch 74. The switch 74 is also preferably arranged as shown to simultaneously control the direct current from battery 75 through leads 76, 76′ and 77 for exciting the rotor of the synchronous motor 29.

A solenoid 78 is provided for withdrawing the latch 18 to institute traversal of the drum 7. This solenoid is energized from battery 75 through leads 79, 81 and 82 under the control of manual switch 83. The starting motor 23 is actuated from a separate cranking battery or motor generator set 84 through leads 85, 86 and 87 under the control of a manual switch 88 or, if preferred, by means of a relay similarly controlled by a manual switch. The light sources are energized preferably by a separate battery or step-down transformer 89 through leads 91 and 92 under the control of manual switch 93.

It will be understood that the motor 9 for driving the drum 7 may also be a synchronous motor if so desired, and in such case since the drum 7 will then be driven at a predetermined constant speed, a certain distance on the surface of the record cylinder will always correspond to a certain time interval and the timing record might be dispensed with. Thus when the drum is constructed with an internal diameter of 7.958 inches, the circumference of the record cylinder is 25 inches, and if the drum is arranged to be rotated at 600 revolutions per minute, one millisecond corresponds to ¼ inch on said record. However, where the highest accuracy is desired without the necessity of correcting for paper shrinkage or other errors, the use of a separate timing device as above described is preferable.

It will be understood that the lines of light 42 as projected on the record cylinder are arranged to coincide with an axial line of said cylinder in order that absolute synchronism of the records shall be secured. For this purpose, the final projection lenses of the optical systems are preferably made vertically adjustable to a slight degree in order that the lines of light projected thereby may be lined up in parallelism with the axis of the drum.

In the operation of this device, the drum box 3 is first taken into a dark room, the light-tight head 94 removed, the head 7a of the drum 7 removed and a sheet of light-sensitive paper such as ordinary photographic bromide paper inserted in the drum so as to completely cover the internal surface thereof, suitable means such as the sheet 20 of elastic opaque material being used to maintain the paper in intimate contact with the surface of the drum and to prevent the light which comes through the paper from diffusing within the drum so as to fog the paper. The head 7a of the drum is then replaced, and the cover 94 of the drum box put on and fastened by suitable means such as clamps 96. The drum box is then brought out and attached to the lens box 2, the synchronous motor 29 for the timing record is started, the shaft 8 of the drum is coupled to the screw shaft 13, and the screw shaft and drum are shifted to the right compressing the spring 15 until the detent 18 falls and locks the screw shaft in starting position.

The light sources are energized by closure of switch 93. The armature and flywheel discs 31 and 55 are preferably set so that the base of a triangular opening comes opposite the scanning slot in order to trace a band on the record, which is caused to narrow down when the respective disc begins to move. The driving motor 9 is thereupon energized by the closure of switch 71 causing the drum to be rotated, the slide 6 of the drum box is drawn out, the detent 18 is tripped by closure of switch 83 in order to start traversal of the drum, and immediately thereafter the starting operation is instituted by the closure of the starting switch 88.

Since the timing disc is being rotated at a constant speed, when the light sources are energized and the slide 6 withdrawn, impressions are made on the record cylinder by the light traversing the timing disc corresponding to exactly equal increments of time and forming a ring around the rotating cylinder. At the same time, the light beams coming through the stationary armature and flywheel discs form a solid ring at the starting end of each record. When the latch 18 is withdrawn, the traversal of the drum 7 under the influence of the spring 15 causes the light impressions to form spirals on the record cylinder having the pitch of the screw threads on shaft 13.

When the starting switch 88 is closed, the energization of the starting motor 23 causes rotation of the armature disc 31 which thereupon causes impressions to be made on the record cylinder corresponding to increments of rotation of the starting motor, these impressions forming a spiral parallel to the timing record. When the starter pinion 27 engages and drives the flywheel gear 26; the consequent rotation of the flywheel disc 55 causes similar impressions to be made on the record cylinder corresponding to increments of rotation of the flywheel.

When the cylinder reaches the end of its longitudinal travel, the slide 6 is pushed in to seal the drum box, all switches are opened, the drum box is thereupon removed to the dark room, the record cylinder taken out and the latent images thereon developed and fixed in the ordinary way. Fig. 6 shows such a record, the spots thereof being greatly enlarged for the sake of clarity.

The records so produced are used for plotting time-rotation curves by laying the record flat on a suitable surface, establishing a base line 98 (Fig. 6) perpendicular to the direction of traversal of the record, and erecting a perpendicular 99 thereto at any selected zero point such as the starting point of the armature shaft. Suitable increments of rotation are then selected as a basis for readings, and the corresponding time increments are determined by erecting a perpendicular from the base line to the corresponding time record. Thus if the armature and flywheel discs have 200 openings therein, each opening corresponds to 1/200 of a revolution which may be taken as a suitable increment, or a multiple thereof may be used. If an increment of 1/200 of a revolution is used, a perpendicular is erected from the same portion such as the base of each mark on the record of the armature disc or flywheel disc as the case may be, and the corresponding time is read from the time record. These corresponding readings are plotted to a suitable scale on coordinate paper to produce the time-rotation curves. It will be readily understood that the R. P. M.-time curves are derived from the rotation time curves by plotting the tangents thereof at suitable intervals.

Since the use of these records entails the counting of a large number of similar marks, it has been found convenient to differentiate a number of the marks to divide them into groups. This is readily done by slightly changing the shape of selected openings in the discs. Thus every 10th opening in the armature and flywheel discs may be formed as a right trapezoid instead of a triangle as illustrated at 97 in Fig. 3.

It has been found convenient to form the timing disc with 200 openings and to rotate the same at 1500 R. P. M. so that five openings correspond to one milli-second. In this case, it is preferred to form distinctively every 10th opening and every 50th opening in order to distinguish two and ten milli-second intervals respectively.

In order to assist in establishing a base line, it has been found convenient to extend one opening of the timing disc laterally beyond the other openings. When the timing disc rotates at 1500 R. P. M. and the record cylinder at 600 R. P. M., the disc makes two and one-half rotations for each rotation of the cylinder so that the images of the extended opening occur every 144 degrees on the cylinder. If the cylinder rotates two or more revolutions before the traversal thereof is instituted, there will consequently appear five images of the elongated slot spaced 72 degrees apart, the bases of which images appear on the edge of the ring which defines the beginning of the time record as illustrated at 100 on Figs. 3 and 6, and when the time record is laid out flat these projections form an excellent guide for establishing the desired base line. It will be understood that when a number of revolutions of the record cylinder take place before the traversal starts, the images of the timing disc openings are superimposed until the photosensitive material of the record is over-exposed, causing spreading of the images in such manner as to render it somewhat difficult to ascertain just where the lower points of the images terminate. Since the images thereof are in registry only every other revolution of the cylinder, and since the base of the extended opening is flat, it is clear that such over-exposure of the images of the extended opening is reduced by half, and it is much easier to establish a definite base line from the bases of such images.

Although one preferred embodiment and adaptation of the invention has been illustrated and certain dimensions and proportions of the parts have been mentioned, it will be understood that the number of the recording units, the character of the sources of illumination, the number and form of the openings in the discs, the components of the optical systems, and the speeds of rotation of the drum and timing disc may all be varied through wide limits in order to adapt the device to various uses and secure the desired results, without departing from the spirit of the invention as defined in the claims appended hereto.

What is claimed is:

1. Apparatus for recording motion of a device including an opaque diaphragm connected to move with said device and having a series of openings therein, means for training a beam of light on said diaphragm in position to traverse said openings, a second opaque diaphragm adjacent the first diaphragm having a slot therein in position to be traversed by said beam of light and arranged substantially normal to the path of movement of said openings, a rotary record drum, and means for projecting an image of said slot as illuminated by said light beam onto said drum parallel to the axis thereof.

2. In a motion recording apparatus in combination with a device the motion of which is to be analyzed, a light source, a light-sensitive record cylinder, means for converging a narrow beam of light from said source onto said cylinder, means for uniformly rotating and traversing said record cylinder and means whereby motion of the device to be analyzed periodically moves the edge of the light beam laterally on the cylinder, obscures the beam, and then repeats the operation for predetermined increments of rotation of the device.

3. Apparatus for recording motion of a device including a light source, a light-sensitive record cylinder, means for converging a ribbon of light from the source onto said cylinder, means for uniformly rotating and traversing said cylinder, and means responsive to uniform increments of motion of said device for moving the edge of said ribbon laterally on the cylinder in a direction dependent on the direction of motion of the device, and causing occultation thereof in synchronized periodicity with said increments of motion.

4. A device for recording the amount and direction of motion of an element including photographic means for recording a series of marks corresponding to equal increments of motion of said element, said means including means whereby reversal of motion of the element causes a distinctive alteration in the character of the marks.

5. A device for recording the speed and direction of motion of an element including a substantially constantly moving recording device, means for photographically impressing thereon a series of images corresponding to equal increments of motion of said element, the spacing of said images on said record showing the speed of motion of the element, and means whereby the shape of said images shows the direction of motion of the element.

6. In a recording apparatus a record drum, means for rotating said drum at uniform speed, independent means for axially traversing said drum, releasable means under the control of the operator for preventing such traversal, and means operative upon the release of said preventing means for governing the rate of traversal in accordance with the rotation of the drum.

7. In a recording apparatus a record drum, means for rotating said drum at uniform speed, means including a spring for urging the drum in an axial direction, means including a releasable latch for holding the drum against axial movement, a shaft having a buttress thread connected axially to the drum for rotation and longitudinal movement in unison therewith, and a spring-pressed detent arranged to engage said buttress thread and thereby control the longitudinal movement of the shaft and drum after release of said latch.

8. Apparatus for recording rotary motion of a device including a disc connected to be rotated by said device and having a circular series of openings near its periphery, a diaphragm having a slot arranged radially to said disc adjacent said openings, a light-sensitive cylinder, means for projecting an image of said slot as illuminated by a beam of light passing through an opening of said disc onto said cylinder, means for rotating said cylinder, independent means for traversing said cylinder in timed relation to its rotation, and means responsive to rotation of the cylinder for controlling the traversing means without substantially affecting said rotation.

CLINTON S. JANES.